United States Patent
Chanda et al.

[19]

[11] Patent Number: 6,067,973

[45] Date of Patent: May 30, 2000

[54] METHOD AND SYSTEM FOR LATE CYCLE OXYGEN INJECTION IN AN INTERNAL COMBUSTION ENGINE

[75] Inventors: Ashok A. Chanda, Peoria; Randall R. Richards, Chillicothe; John T. Vachon, Peoria, all of Ill.

[73] Assignee: Caterpillar, Inc., Peoria, Ill.

[21] Appl. No.: 09/235,721

[22] Filed: Jan. 22, 1999

Related U.S. Application Data

[60] Provisional application No. 60/100,021, Sep. 11, 1998.

[51] Int. Cl.[7] ................................................. F02B 23/00
[52] U.S. Cl. ........................................ 123/585; 123/586
[58] Field of Search ................................... 123/585, 586, 123/587

[56] References Cited

U.S. PATENT DOCUMENTS

| | | | |
|---|---|---|---|
| 5,080,061 | 1/1992 | Nishimura | 123/585 |
| 5,147,417 | 9/1992 | Nemser | 55/16 |
| 5,400,746 | 3/1995 | Susa et al. | 123/25 C |
| 5,517,978 | 5/1996 | Yi | 123/585 |
| 5,522,349 | 6/1996 | Yoshihara et al. | 123/25 C |
| 5,526,641 | 6/1996 | Sekar et al. | 60/274 |
| 5,553,591 | 9/1996 | Yi | 123/585 |
| 5,636,619 | 6/1997 | Poola et al. | 123/585 |
| 5,640,845 | 6/1997 | Ng et al. | 60/274 |
| 5,649,517 | 7/1997 | Poola et al. | 123/585 |
| 5,992,400 | 11/1999 | Meiwes | 123/586 |

*Primary Examiner*—John Kwon
*Attorney, Agent, or Firm*—Robert J. Hampsch

[57] ABSTRACT

A method and system for late cycle injection of oxygen enriched air into the combustion chamber of an internal combustion engine is disclosed. The late cycle oxygen injection system is part of an airflow management system that effectively controls the use of oxygen and nitrogen available in the intake air. The preferred system comprises an intake air separation device adapted for separating a prescribed portion of intake air into a flow of oxygen enriched air and a flow of nitrogen enriched air. The system includes an oxygen enriched air flow circuit extending from the intake air separating device to one or more combustion chambers and a control device adapted for controlling the introduction of the oxygen enriched air into the combustion chambers late in a combustion cycle in response to selected engine operating conditions such as engine speed or engine load or both. Preferably, the introduction of the oxygen enriched air into the combustion chamber occurs late in a combustion cycle at a crank angle between about 20 degrees and 120 degrees after top dead center and lasts for a prescribed time interval between about 5 degrees and 20 degrees of crank angle movement.

18 Claims, 5 Drawing Sheets

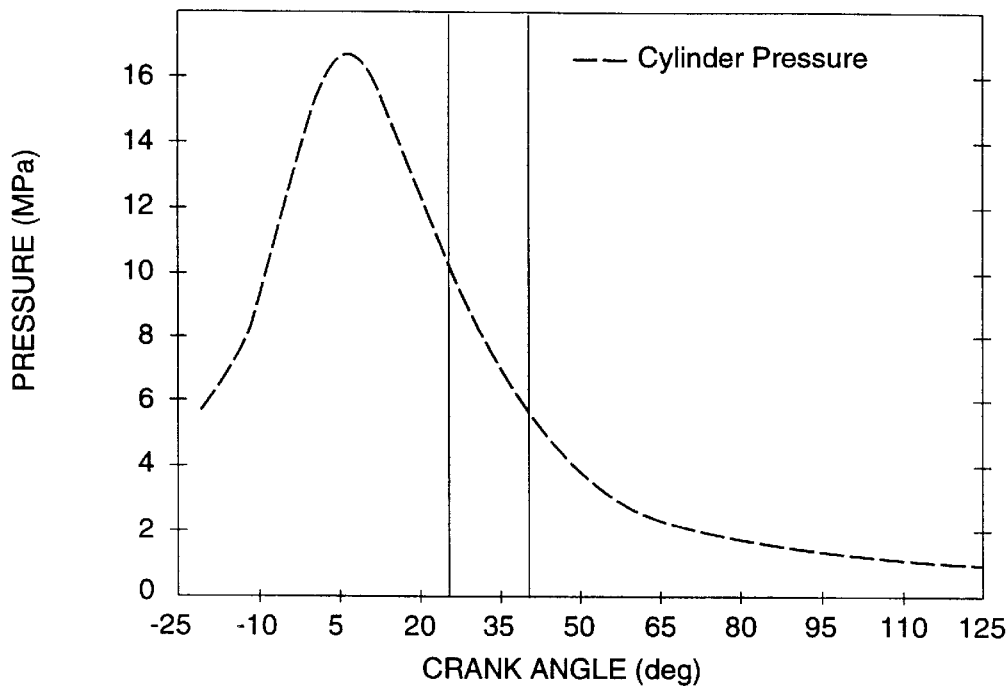
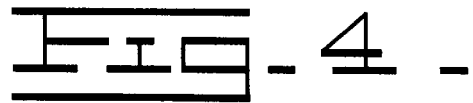
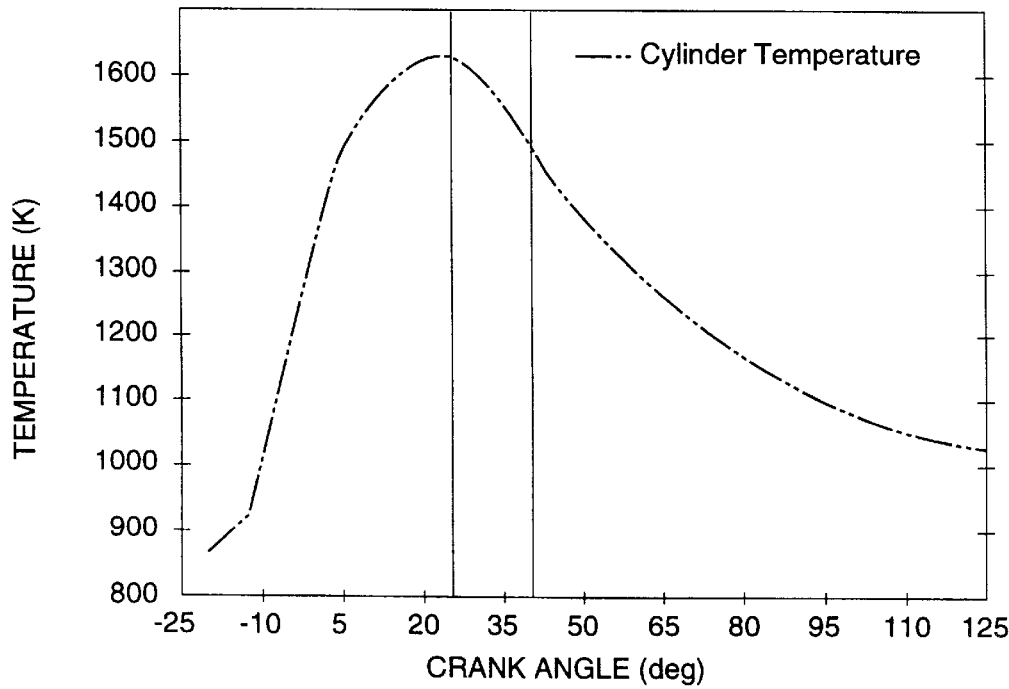

METHOD AND SYSTEM FOR LATE CYCLE OXYGEN INJECTION IN AN INTERNAL COMBUSTION ENGINE

CROSS REFERENCE TO RELATED APPLICATIONS

This application claims the benefit of prior provisional patent application Ser. No. 60/100,021 filed Sep. 11, 1998.

TECHNICAL FIELD

The present invention relates to a method and system for late cycle oxygen injection in an internal combustion engine and more particularly to an engine airflow management system that involves the dedicated uses of oxygen enriched air for reducing engine pollution and increasing engine performance. More specifically, the present airflow management system involves the introduction of oxygen enriched air into the combustion chamber during the later stages of the combustion cycle.

BACKGROUND OF THE INVENTION

In recent years, internal combustion engine makers have been faced with ever increasing regulatory requirements. These requirements have been directed mainly at two aspects of engine performance, namely fuel economy and exhaust emissions. Exhaust emissions takes on a number of forms including particulate matter and oxides of nitrogen (NOx). As is generally know in the art, particulate matter is comprised of mainly unburned hydrocarbons and soot whereas NOx is an uncertain mixture of oxides of nitrogen (mainly NO and some NO2). Different forms of airflow management systems have been used to improve each of these characteristics.

One well-known method of decreasing fuel consumption is by increasing the amount of air in the cylinder. Typically this has been accomplished by pressurizing the air taken into the combustion chamber. The main goal of this pressurization is to increase the oxygen available for combustion. Others have increased the concentration of oxygen in the combustion air using air separation techniques. See, for example, U.S Pat. No. 5,649,517 (Poola et al.) issued on Jul. 22, 1997 which discloses the use of a semi-permeable gas membrane to remove a portion of nitrogen from the intake air flow to create an oxygen enriched air supply. See also U.S. Pat. Nos. 5,526,641 (Sekar et al.) and 5,640,845 (Ng et al.) which disclose similar air separation techniques for creating oxygen enriched air as well as nitrogen enriched air. Another related art disclosure of interest is U.S. Pat. No. 5,553,591 (Yi) issued to on Sep. 10, 1996 which shows a vortex air separation system for creating oxygen enriched intake air to increase the power generated during combustion. Introduction of oxygen enriched intake air during the intake stroke facilitates burning a larger part of the available fuel injected which in turn increases the power output for each combustion cycle or charge and generally reduces brake specific fuel consumption (BSFC). Lower BSFC correlates strongly with reduction in unburned fuel.

Manipulation or control of the airflow system within an engine has also been tried for the purpose of reducing emissions such as particulates and NOx. Most particulates generated during the combustion cycle form relatively early in the combustion cycle, but such early forming particulates usually burn as temperature and pressure increase during the combustion cycle. The particulates that typically enter the exhaust stream tend to form in the latter part of the combustion cycle as the pressure and temperature decreases. In addition to decreasing BSFC, increasing air intake oxygen content serves to reduce the quantity of unburned hydrocarbons by increasing the likelihood of complete combustion.

Aftertreatment of exhaust gas is useful in reducing the amount of unburned hydrocarbons. Aftertreatment methods take steps to continue the oxidation of the unburned hydrocarbons. One manner is by introducing a secondary air supply into the exhaust stream. This secondary air stream provides more oxygen to the already high temperature exhaust ensuring further oxidation. While using secondary air is effective in eliminating particulates, a secondary air system creates a higher temperature in the exhaust system. Designing the exhaust system for these higher temperatures requires components able to withstand the hotter environment. These components often times are heavier, more expensive, or require more frequent servicing.

While particulate production generally decreases along with fuel consumption, NOx production generally increases. NOx forms where nitrogen mixes in a high temperature setting with excess oxygen not used in the combustion process. Thus, while excess oxygen and high combustion temperatures are beneficial in reducing fuel consumption, such combination is detrimental in terms of increased NOx formation. This conflict generally leads engine manufacturers to delicately balance NOx production with BSFC and particulate matter in order to meet emission regulations. The present invention resolves, at least in part, the continuing conflict between reducing particulates, reducing NOx, and decreasing BSFC.

Exhaust Gas Recirculation (EGR) is one manner of airflow management currently in use to reduce NOx formation within the combustion cylinder. EGR reduces the amount of available oxygen for formation of NOx. By reducing the amount of oxygen, the combustion process is also slowed thereby reducing the peak temperatures in the combustion chamber. EGR systems typically use exhaust gas, however Poola shows using an enriched nitrogen source instead of exhaust gas to displace oxygen in the combustion chamber. The enriched nitrogen is both cleaner and cooler than exhaust gas.

Like particulate matter reduction, NOx emissions may be decreased using various aftertreatment methods. For example, the Poola et al., Sekar et al., and Ng et al. disclosures all show an aftertreatment system using enriched nitrogen supply to reduce NOx. As disclosed therein, the enriched nitrogen supply is exposed to a spark source to form nitrogen plasma. Directing the nitrogen plasma stream into the exhaust stream results in a chemical reaction forming nitrogen gas and oxygen gas.

From the above discussion it appears well known that oxygen enriched air and nitrogen enriched air have a number of beneficial uses within an internal combustion engine and a diesel engine in particular. However, these uses are not always complimentary. Also, production of oxygen enriched air and nitrogen enriched air requires energy. These energy requirements place a limit on the availability of enriched air. Like any limited resource, the enriched air must be efficiently managed. In this case, the air flow management system needs to prioritize power requirements, particulate formation, and NOx production in light of emission regulations and operator demand. In most situations, one factor (e.g. power, particulates, or NOx) may dominate over the other factors. What is needed therefor is an air flow management system that effectively balances the emissions and fuel consumption requirements of an internal combustion engine, such as a diesel engine. For instance, under certain operating conditions NOx emissions may be reduced using nitrogen in lieu of exhaust gas in an EGR system or by using nitrogen within the aftertreatment method, or both. On other occasions enriched oxygen might be required to either increase power or reduce particulates. The present invention is directed at overcoming one or more of the problems set forth above.

SUMMARY OF THE INVENTION

The present invention is a method and system for late cycle injection of oxygen enriched air into the combustion chamber of an internal combustion engine. As disclosed herein, the late cycle oxygen injection system is an airflow management system that comprises an intake air separation device adapted for separating a prescribed portion of intake air into a flow of oxygen enriched air and a flow of nitrogen enriched air. The system includes an oxygen enriched air flow circuit extending from the intake air separating device to a combustion chamber and a control device adapted for controlling the introduction of the oxygen enriched air into the combustion chamber late in a combustion cycle in response to selected engine operating conditions such as engine speed or engine load or both.

Preferably, the introduction of the oxygen enriched air into the combustion chamber occurs late in a combustion cycle at a crank angle between about 20 degrees and 120 degrees after top dead center and lasts for a prescribed time interval between about 5 degrees and 20 degrees of crank angle movement.

In the disclosed embodiment, the intake air separation device comprises a selectively permeable membrane device adapted for separating nitrogen from intake air and producing nitrogen enriched air at a first outlet and oxygen enriched air at a second outlet. The intake air separation device also includes an intake air driver adapted for forcibly passing the portion of intake air through said selectively permeable membrane device.

The invention may also be characterized as a method of reducing particulate emissions from a compression ignition engine comprising the steps of: (a) operating the normal intake and compression strokes of the compression ignition engine including inducting a charge of intake air from the intake manifold into the combustion chamber, compressing the charge of intake air in the combustion chamber, introducing fuel into the combustion chamber and igniting the mixture of fuel and charge of compressed intake air to form expanding exhaust gas within the combustion chamber; (b) introducing a charge of supplemental oxygen enriched air into said combustion chamber late in a combustion cycle after ignition of the mixture of fuel and charge of compressed intake air, wherein the charge of supplemental oxygen enriched air reacts with the exhaust gases resident within in said combustion chamber to form exhaust gases having reduced particulate content; and (c) moving said piston assembly within said cylinder to expel said exhaust gases having reduced particulate content from the combustion chamber to the exhaust system.

BRIEF DESCRIPTION OF THE DRAWINGS

The above and other aspects, features and advantages of the present invention will be more apparent from the following more particular description thereof, presented in conjunction with the following drawings, wherein:

FIG. 3 illustrates a typical cylinder pressure verses piston location graph for the engine of FIG.1 and further graphically depicting the introduction of oxygen enriched air late in the combustion cycle;

FIG. 4 illustrates a typical cylinder temperature verses piston location graph for the engine of FIG.1 and further graphically depicting the introduction of oxygen enriched air late in the combustion cycle;

Corresponding reference numbers indicate corresponding components throughout the several views of the drawings.

PREFERRED EMBODIMENT TO THE INVENTION

The following description is of the best mode presently contemplated for carrying out the invention. This description is not to be taken in a limiting sense but is made merely for the purpose of describing the general principals of the invention. The scope and breadth of the invention should be determined with reference to the claims.

Figure 1:
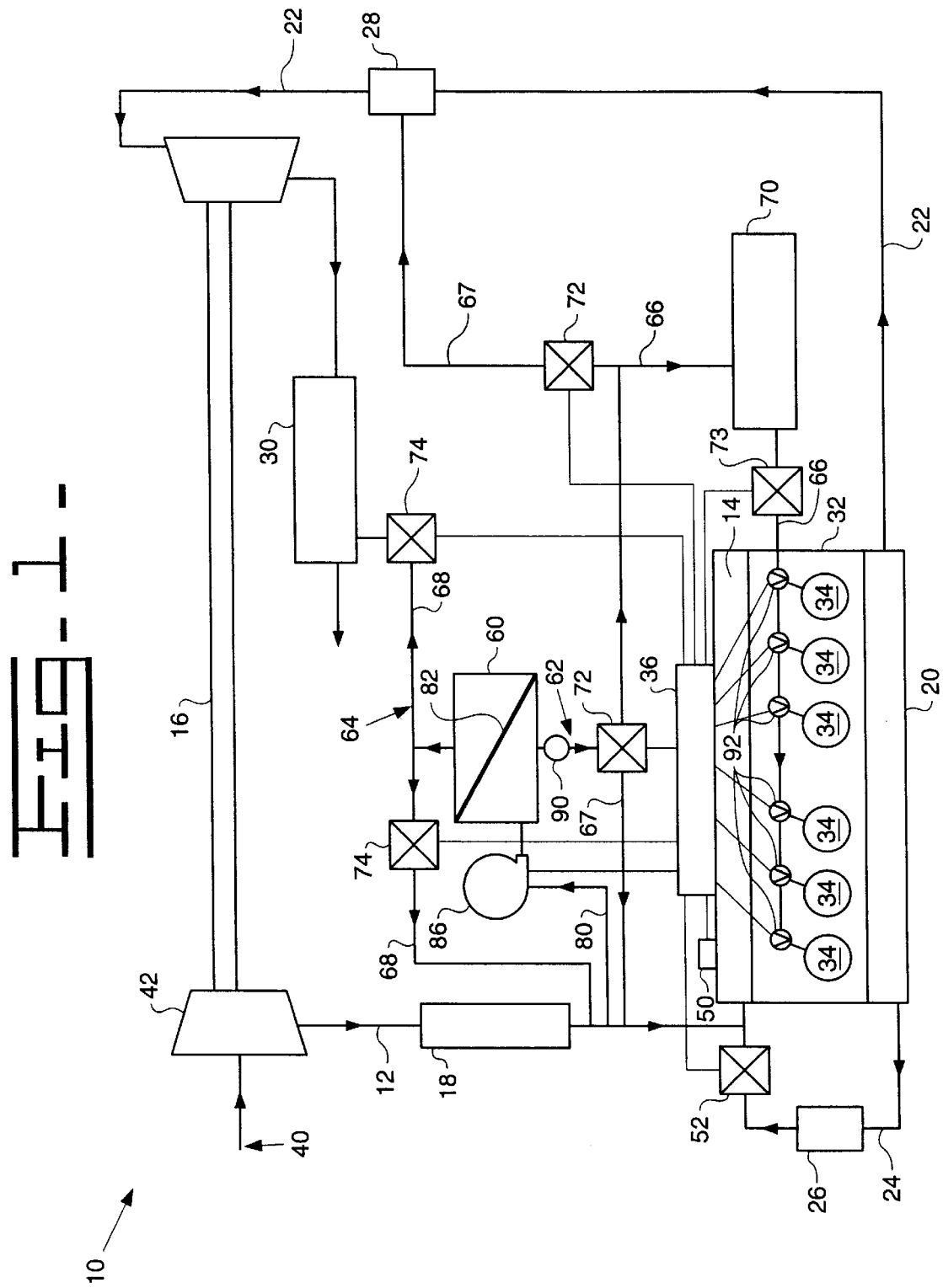
FIG. 1 depicts a schematic diagram of an internal combustion engine incorporating the air flow management system in accordance with the present invention.

Turning now to the drawings and particularly FIG. 1, there is shown a schematic diagram of an airflow management system 10 for an internal combustion engine having an air intake system including an intake air conduit 12, an intake manifold 14, exhaust gas driven turbocharger 16, an air to air aftercooler (ATAAC) 18; an exhaust system including an exhaust manifold 20, a primary exhaust gas conduit 22, and optionally an exhaust gas recirculation (EGR) conduit 24, EGR cooler 26, particulate trap 28, and aftertreatment subsystem 30; and a main combustion section 32 that includes, among other elements, a plurality of combustion cylinders each having a fuel injector (not shown) associated therewith, an intake port, an intake valve, an exhaust port, an exhaust valve, and a reciprocating piston moveable within the cylinder to define the combustion chamber 34. The engine also includes an engine control module (ECM) 36 for operatively controlling the fuel injection and air system valve operations in response to one or more measured engine operating parameters, used as inputs to the ECM 36. An internal combustion engine may come in a number of different engine configurations including "in-line" and"V" type engines. The disclosed intake air management system is operative regardless of the engine configuration.

As seen in FIG. 1, the intake air conduit 12 is in flow communication with intake air input 40, the compressor 42 of the exhaust gas driven turbocharger 16, and the ATAAC 18. Although the present intake airflow management system 10 is shown and described in conjunction with a turbocharged diesel engine, the disclosed system is equally useful on other supercharged engines, including COMPREX equipped engines. The intake manifold 14 is connected to an end of the intake air conduit 12 and an EGR conduit 24. An inlet pressure sensor 50 is located in the intake manifold and provides pressure data to the ECM 36. Other sensors such as temperature sensors, oxygen sensors (not shown) may also be incorporated within the intake air system and likewise coupled to the ECM 36. In addition, various other devices such as filters, valves, actuators, bypass conduits, etc., although not shown may also be incorporated within the intake air system. Any such operative components such as valves and actuators are preferably operatively coupled to the ECM 36 and operate in response to selected engine operating parameters or conditions.

The exhaust system includes an exhaust manifold 20 adapted to receive exhaust gases expelled from each of the combustion chambers 34 and, as illustrated in FIG. 1, may include an EGR system that includes the EGR conduit 24 connecting the exhaust system with the intake air system of the engine, an EGR valve 52, an EGR cooler 26, and other elements commonly found in EGR systems such as traps, filters, bypass conduits, etc. Likewise, the illustrated embodiment includes an aftertreatment subsystem 30, such as a plasma catalyst system for reducing NOx emissions.

The air flow management system 10 includes an intake air separation device 60 disposed within the intake air system of the engine that is adapted for separating a portion of intake air into a flow of oxygen enriched air 62 and a flow of nitrogen enriched air 64. The air flow management system 10 further includes an oxygen enriched air conduit 66 or circuit extending from the intake air separating device 60 various oxygen introduction locations such as the combustion chambers 34 while circumventing the intake manifold 14. Oxygen enriched air conduits 67 may also extend from the intake air separating device 60 to the intake air system (as supplemental oxygen) or to the exhaust system (to regenerate particulate traps). In addition, nitrogen enriched air conduits 68 or circuits extending from the intake air separating device 60 to the intake air system (in lieu of EGR gas) and/or to the-aftertreatment system 30. Either or both of the enriched air circuits may also include a plenum 70 or other accumulating device such that the oxygen enriched intake air or nitrogen enriched air can be injected on demand to the appropriate location. As seen in FIG. 1, the oxygen enriched air circuit 66 leading to the combustion chambers is in flow communication with an oxygen enriched air plenum 70. In addition, both the oxygen enriched air circuits 66, 67 as well as the nitrogen enriched air circuits 68 include one or more flow control devices or valves 72,74 which are actuated in response to signals received from the ECM 36. The valves 72 located within the oxygen enriched air circuit control the flow of the oxygen enriched air into the combustion chamber. Likewise, the flow control valves 74 located within the nitrogen enriched air circuit controls the flow of the nitrogen-enriched air to the EGR conduit, the aftertreatment system or both. Each of the flow control valves 72,74 located within the oxygen enriched air circuit and nitrogen enriched air circuit are operatively controlled by the ECM 36 in response to selected engine operating parameters or conditions.

More specifically, intake air passing through the intake air conduit 12 is diverted through an air conduit 80 into an air separation device 60. The air separation device 60 has an oxygen side and a nitrogen side. In FIG. 1, the air separation device preferably uses a selectively permeable separation membrane 82, as disclosed in U.S. Pat. Nos. 5,649,517 (Poola et al.); 5,526,641 (Sekar et al.); 5,640,845 (Ng et al.); and 5,147,417 (Nemser) to separate the intake air into separate flows of oxygen enriched air (from the oxygen side) and nitrogen enriched air (from the nitrogen side). Alternatively, it is contemplated that the air separation device 60 could include a vortex separator or other air separation means.

In the preferred embodiment, a blower 86 is connected in the air separation conduit 80 between the intake air conduit 12 and the inlet of the air separation device 60 to forcibly move intake air to the air separation device 60. The ECM 36 operatively controls the blower. An oxygen enriched air conduit 66,67 exits the oxygen side of the air separation device and optionally enters a vacuum pump 90. The ECM 36 also operatively controls the vacuum pump 90, if used. An optional oxygen sensor is disposed in the oxygen enriched air conduit intermediate of the vacuum pump and the air separation device. Although illustrated as using a blower 86 and a vacuum pump 90, it is contemplated that the air flow management system disclosed herein could use a turbocharger compressor or other driver means to create the needed pressure differential presently created by the combination of the blower 86 and the vacuum pump 90.

After exiting the vacuum pump 90, the oxygen enriched air conduit 66 connects to an oxygen manifold or plenum 70. A relief valve 73 is placed in or near the oxygen manifold to prevent over-pressurization. Each combustion chamber 34 is connected to the oxygen plenum 70 via an oxygen enriched air conduit 66. Flow of oxygen enriched air to each combustion chamber 34 is controlled by means of one or more oxygen boost valves 92 or similar such flow control devices which, like the other flow control devices 72 within the system are operatively controlled by the ECM 36. The boost pressure applied to the oxygen enriched air must be sufficient to inject a prescribed volume of oxygen enriched air into each combustion chamber 34 preferably late in the combustion cycle.

Figure 2:
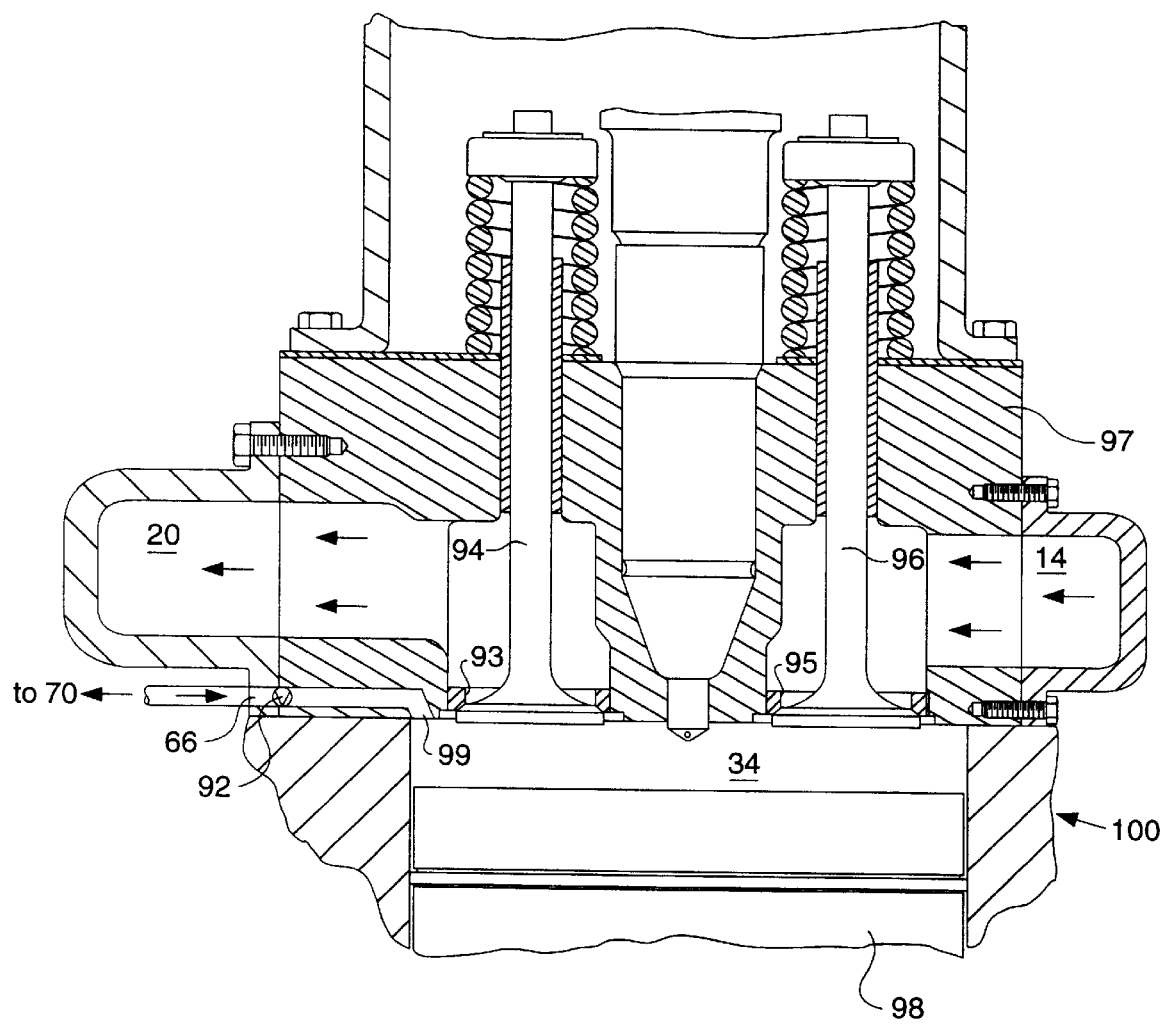
FIG. 2 depicts a more detailed view of a combustion chamber and air flow management system of the engine of FIG. 1 and the introduction of oxygen enriched air into the combustion chamber late in the combustion cycle.

FIG. 2 depicts a view of a combustion chamber 34 and air flow management system 10 of the engine described above and shown in FIG. 1. The disclosed embodiment shows an exhaust port 93, an exhaust valve 94, an intake port 95, and an intake valve 96 in a cylinder head 97 and a piston 98. Additionally the cylinder head 97 has an oxygen port 99 to provide oxygen-enriched air 62 either during the intake stroke or, more preferably, late in the combustion cycle. The oxygen port 99 is coupled to the oxygen enriched air conduits 66 and the oxygen side of the air flow separation device 60. The oxygen enriched air conduits 66 associated with each cylinder preferably includes oxygen boost valves 92 displaced between the plenum 70 and the oxygen port in the respective cylinder head of the combustion chamber 34. While the present embodiment shows the oxygen port 99 on the top of the cylinder, the oxygen port may be located lower on the combustion chamber wall 100 to alleviate exposure to the higher cylinder pressures and temperatures. Each oxygen boost valve 92 is connected to and controlled by the ECM 36 (not shown).

Referring back to FIG. 1, the nitrogen side of the air separation device 60 is connected to the intake air system and/or the intake manifold 14 by a nitrogen enriched air conduit 68. An optional oxygen sensor (not shown) is disposed in the nitrogen enriched air conduit 68. The oxygen sensor (not shown) may be used to provide an input to the ECM 36 to optionally control the air flow management system 10. A second nitrogen enriched air conduit 68 connects the nitrogen side of the air separation device 60 to a prescribed location in the exhaust gas conduit 22 to allow use of nitrogen enriched air 64 within an aftertreatment subsystem 30. A nitrogen control valve 74 is disposed in one or both nitrogen enriched air conduits 68 and operatively connected to and controlled by the ECM 36 using various control strategies.

Industrial Applicability

The present invention is an airflow management system that effectively controls the use of oxygen and nitrogen available in the intake air. The ECM uses various engine operating parameters and optionally oxygen concentrations in the inlet air conduit, the oxygen enriched air conduit, and the nitrogen enriched air conduits to allocate oxygen and nitrogen usage. The uses of oxygen enriched air include introduction into the engine as combustion air for increased power, introduction into the combustion chamber late in the combustion cycle to reduce particulate matter, to regenerate particulate matter traps and storage of oxygen enriched air in the oxygen enriched air plenum. Nitrogen enriched air uses include introduction into the exhaust gas conduit, introduction into the EGR conduit or intake manifold to function as EGR gas, and introduction in to the aftertreatment subsystems, such as a non-thermal plasma catalyst system to reduce NOx emissions.

Referring now to FIGS. 3–7, there are shown various KIVA simulations of the late cycle oxygen injection. Specifically, FIG. 3 illustrates a typical cylinder pressure verses crank angle position together with the preferred region of oxygen injection. The regime of late cycle oxygen injection is preferably between a crank angle position of 20 degrees and 50 degrees (with 0 degrees being top dead center) and more preferably a crank angle position of 25 degrees and 40 degrees. Likewise FIG. 4 illustrates a typical cylinder temperature verses crank angle position illustrating the same late cycle oxygen injection profile. As seen therein the duration of oxygen injection is between about 5 and 20 degrees of crank angle movement and more preferably about 15 degrees of crank angle movement. Operational considerations suggest the oxygen injection occur where the cylinder pressures are about 10 MPa or less, although it may be feasible to inject the oxygen at higher pressures with an appropriate injection device, such as an injector capable of separate injection of high pressure fuel and late cycle oxygen enriched air.

Figure 5:
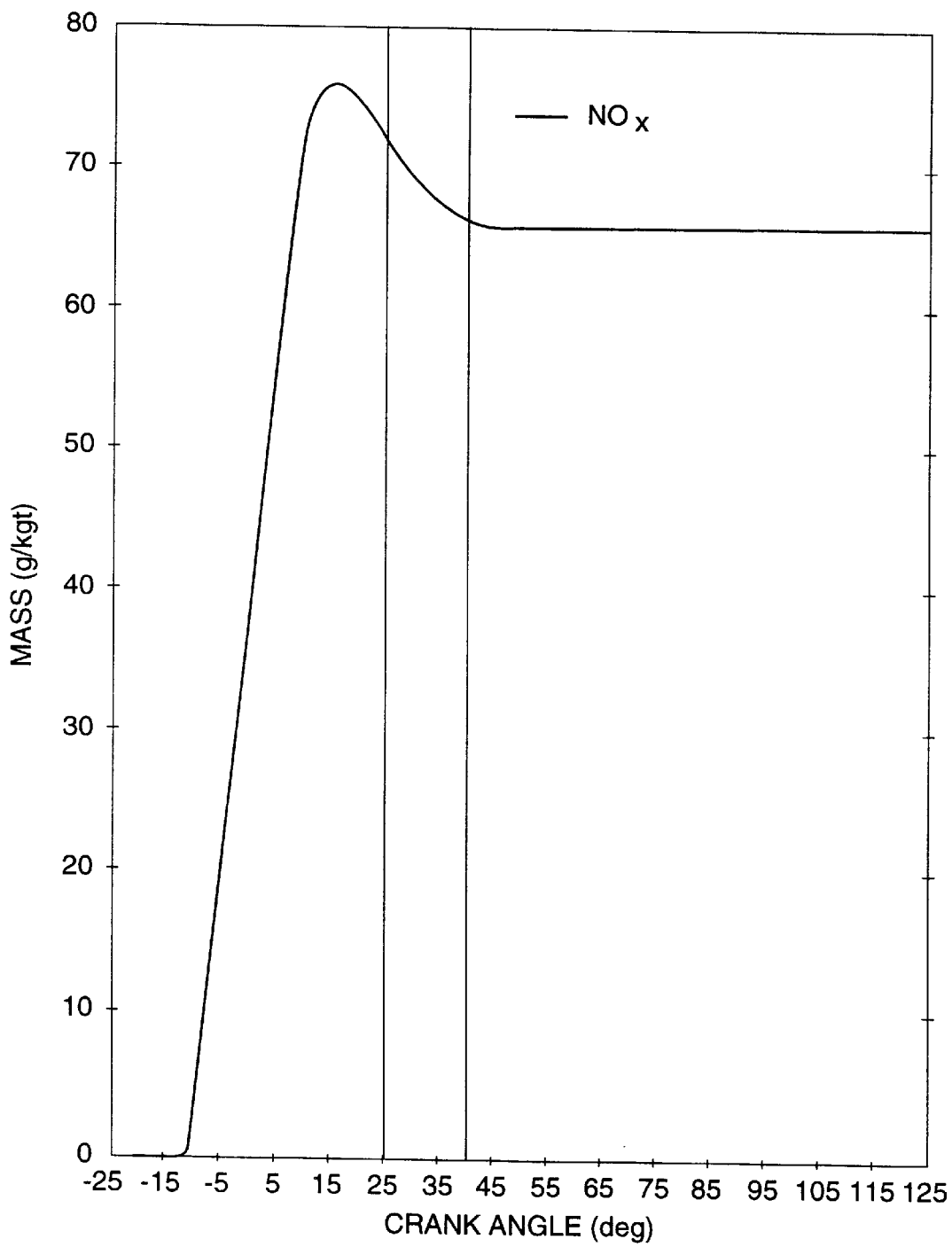
FIG. 5 is a graphical simulation of the NOx content within a cylinder verses piston location and further depicting the effects of introducing oxygen enriched air late in the combustion cycle.
Figure 6:
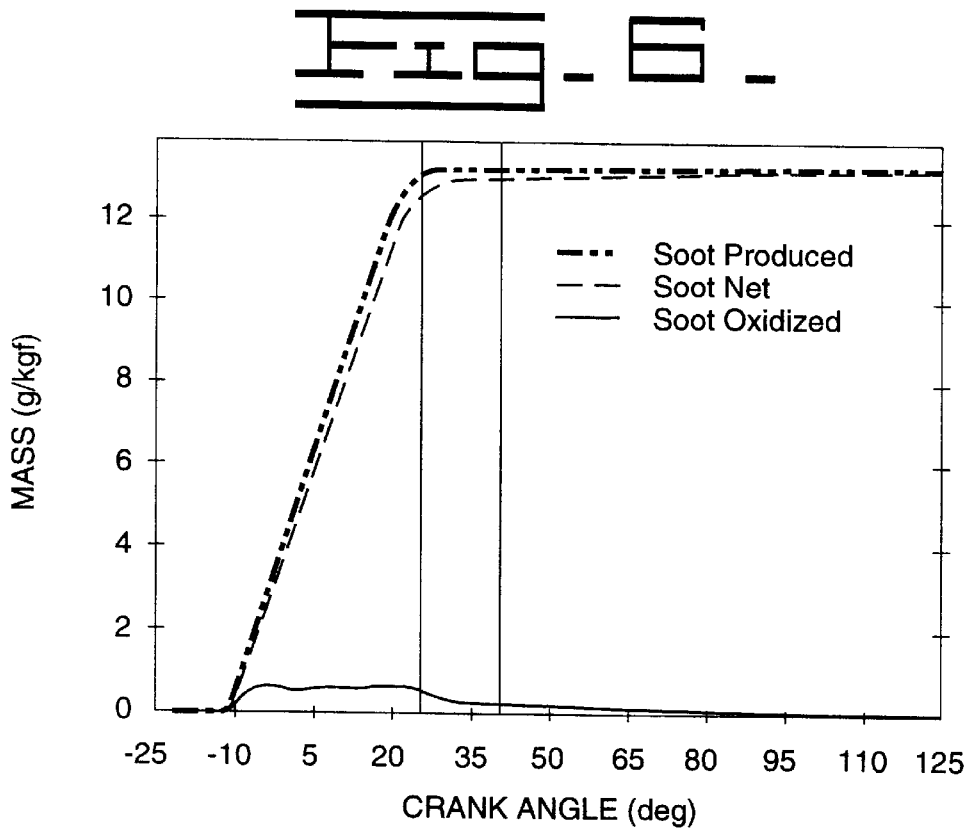
FIG. 6 is a graphical simulation of the soot content within a cylinder verses piston location and further depicting the effects of introducing oxygen enriched air late in the combustion cycle.
Figure 7:
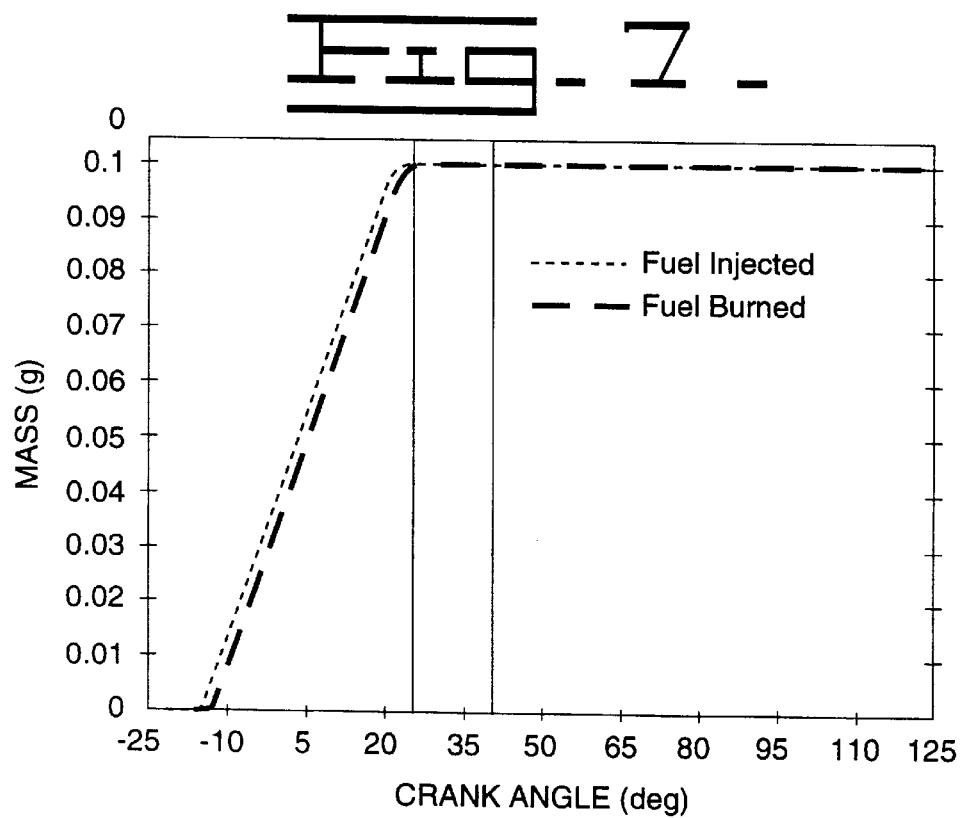
FIG. 7 is a graphical simulation of the fuel injected and burned within a cylinder verses piston location and further depicting the effects of introducing oxygen enriched air late in the combustion cycle.

FIG. 5 is a graphical simulation of the NOx content within a cylinder verses the crank angle position that illustrates the general formation of NOx within the cylinder. Similarly, FIG. 6 is a graphical simulation of the soot content within a cylinder verses the crank angle position and FIG. 7 is a graphical simulation of the fuel injected and burned within a cylinder verses crank angle position. These later graphs show that the soot content in particular noticeable decreases upon the injection of oxygen enriched air during a later portion of the combustion cycle. In addition, the amount of fuel burned within the cylinder fuel closely approaches the amount of fuel injected after the supplemental injection of oxygen enriched air within the cylinder at the prescribed time and for a prescribed duration.

Clearly, the use of oxygen enriched air injected or otherwise introduced directly into the cylinder during the expansion stroke is beneficial during engine operating conditions that are typically high output of particulate matter and soot. Similarly, the introduction of oxygen enriched air into the intake manifold or intake air circuit or even as use to regenerate the particulate matter traps is of particular benefit during selected regions of the engine-operating envelope. The utilization of nitrogen enriched air as an inert gas in the intake or as an aftertreatment aid is also particularly beneficial at selected operating conditions (i.e. engine speed, engine load, exhaust gas temperatures, etc.).

From the foregoing, it can be seen that the disclosed invention is an air flow management system for an internal combustion engine that includes the production and utilization of oxygen enriched air and nitrogen enriched air for reducing engine particulate matter and NOx and for increasing engine performance. Of particular importance is the introduction of oxygen enriched air into the combustion chamber during the later stages of the combustion cycle. While the invention herein disclosed has been described by means of specific embodiments and processes associated therewith, numerous modifications and variations could be made thereto by those skilled in the art without departing from the scope of the invention as set forth in the claims.

We claim:

1. An air flow management system for an internal combustion engine, said engine having an intake manifold and at least one combustion chamber, an intake air system adapted for providing intake air to said intake manifold and said combustion chamber, and an exhaust system adapted for transporting exhaust gases from said combustion chamber, said air flow management system comprising:

intake air separation device disposed within said intake air system and adapted for separating a prescribed portion of intake air into a flow of said oxygen enriched air and a flow of nitrogen enriched air;

an oxygen,enriched air flow circuit extending from said intake air separating device to said combustion chamber while circumventing said intake manifold;

a flow control device disposed along said oxygen enriched air flow circuit, said flow control device adapted for introducing said oxygen enriched air from said oxygen enriched air circuit into said combustion chamber; and a controller operatively coupled to said flow control device and adapted to control the introduction of said oxygen enriched air into said combustion chamber late in a combustion cycle in response to selected engine operating conditions.

2. The air flow management system of claim 1 wherein said intake air separation device further comprises:

an intake air inlet;

a selectively permeable membrane device in flow communication with said intake air inlet, said selectively permeable membrane adapted for separating nitrogen from intake air received at said intake air inlet and producing nitrogen enriched air at a first outlet and oxygen enriched air at a second outlet;

an intake air driver operatively connected with said selectively permeable membrane device and adapted for forcibly passing said intake air received at said intake air inlet through said selectively permeable membrane device.

3. The air flow management system of claim 1 wherein said oxygen enriched air flow circuit further includes:

an oxygen enriched air conduit extending from said intake air separating device to said combustion chamber;

an oxygen plenum disposed along said oxygen enriched air conduit, said plenum adapted for accumulating a prescribed quantity said oxygen enriched air; and said flow control device is disposed along said oxygen enriched air conduit between said plenum and said combustion chamber.

4. The air flow management system of claim 1 wherein said controller is adapted to control the introduction of said oxygen enriched air into said combustion chamber at a crank angle between about 20 degrees and 120 degrees.

5. The air flow management system of claim 1 wherein said controller is adapted to control the introduction of said oxygen enriched air into said combustion chamber at a crank angle between about 20 degrees and 50 degrees after top dead center.

6. The air flow management system of claim 1 wherein said controller is adapted to control the duration of said oxygen enriched air introduced into said combustion chamber between about 5 degrees and 20 degrees of crank angle movement.

7. The air flow management system of claim 1 wherein said controller is adapted to control the introduction of said oxygen enriched air into said combustion chamber in response to engine speed and engine load.

8. A method of reducing particulate emissions from a compression ignition engine, said engine having an intake manifold and at least one piston assembly moveable within a cylinder to form a combustion chamber, an intake air system adapted for providing intake air to said intake manifold and combustion chamber, and an exhaust system adapted for transporting exhaust gases from said combustion chamber, said method comprising the steps of:

moving said piston assembly in said cylinder to increase the volume of said combustion chamber and inducting a charge of intake air from said intake manifold into said combustion chamber;

moving said piston assembly in said cylinder to compress said charge of intake air in said combustion chamber;

introducing fuel into said combustion chamber and igniting said mixture of fuel and charge of compressed intake air to form expanding exhaust gas within said combustion chamber;

introducing a charge of supplemental oxygen enriched air into said combustion chamber late in a combustion cycle after ignition of said mixture of fuel and charge of compressed intake air, wherein said charge of supplemental oxygen enriched air reacts with said exhaust gases resident within in said combustion chamber to form exhaust gases having reduced particulate content; and moving said piston assembly within said cylinder to expel said exhaust gases having reduced particulate content from said combustion chamber to said exhaust system.

9. The method of claim 8 wherein the step of introducing said charge of supplemental oxygen enriched air into said combustion chamber late in said combustion cycle further comprises the steps of:

forming a supply of oxygen enriched air using an intake air separation device;

controlling timing and volume of oxygen enriched air introduced to said combustion chamber in response to selected engine operating conditions; and introducing said prescribed volume of supplemental oxygen enriched air into said combustion chamber at said prescribed timing wherein said charge of supplemental oxygen enriched air reacts with said exhaust gases resident within in said combustion chamber to form exhaust gases having reduced and particulate content.

10. The method of claim 9 wherein the introduction of said charge of supplemental oxygen enriched air into said combustion chamber occurs during said expansion at a crank angle between about 20 degrees 50 degrees.

11. The method of claim 9 wherein the introduction of said charge of supplemental oxygen enriched air into said combustion chamber occurs during a prescribed time interval corresponding to between about 5 degrees and 20 degrees of crank angle movement.

12. The method of claim 9 wherein said prescribed volume of said charge of supplemental oxygen enriched air introduced into said combustion chamber varies in response to engine speed and engine load.

13. An air flow management system for an internal combustion engine, said engine having an intake manifold and at least one combustion chamber, an intake air system adapted for providing intake air to said intake manifold and combustion chamber, and an exhaust system adapted for transporting exhaust gases from said combustion chamber, said air flow management system comprising:

an oxygen enriched air source;

an oxygen enriched air flow circuit extending from said oxygen enriched air source to said combustion chamber while circumventing said intake manifold;

a flow control device disposed along said oxygen enriched air flow circuit, said flow control device adapted for introducing said oxygen enriched air from said oxygen enriched air circuit into said combustion chamber; and a controller operatively coupled to said flow control device and adapted to control the introduction of said oxygen enriched air into said combustion chamber late in said combustion cycle in response to selected engine operating conditions.

14. The air flow management system of claim 13 wherein said oxygen enriched air source further comprises an intake air separation device disposed within said intake air system and adapted for separating a prescribed portion of intake air into a flow of said oxygen enriched air and nitrogen enriched air and wherein said oxygen enriched air flow circuit extends from said intake air separating device to said combustion chamber while circumventing said intake manifold.

15. The air flow management system of claim 14 wherein said intake air separation device further comprises:

an intake air input;

a selectively permeable membrane device in flow communication with said intake air input, said selectively permeable membrane adapted for separating nitrogen from intake air received at said intake air input and producing nitrogen enriched air at a first output and oxygen enriched air at a second output;

an intake air driver operatively connected with said selectively permeable membrane device and adapted for forcibly passing said intake air received at said intake air input through said selectively permeable membrane device.

16. The air flow management system of claim 13 wherein said controller is adapted to control the introduction of said oxygen enriched air into said combustion chamber at a crank angle between about 20 degrees 50 degrees.

17. The air flow management system of claim 13 wherein said controller is adapted to control the introduction of said oxygen enriched air into said combustion chamber during a prescribed interval of between about 5 degrees and 20 degrees of crank angle movement.

18. The air flow management system of claim 13 wherein said controller is adapted to control the introduction of said oxygen enriched air into said combustion chamber in response to engine speed and engine load.

* * * * *